United States Patent
Sanyal et al.

(10) Patent No.: US 9,870,376 B2
(45) Date of Patent: Jan. 16, 2018

(54) METHOD AND SYSTEM FOR CONCEPT SUMMARIZATION

(75) Inventors: Subhajit Sanyal, Bangalore (IN); Dhruv Kumar Mahajan, Bangalore (IN); Sundararajan Sellamanickam, Bangalore (IN)

(73) Assignee: Excalibur IP, LLC, Sunnyvale, CA (US)

( * ) Notice: Subject to any disclaimer, the term of this patent is extended or adjusted under 35 U.S.C. 154(b) by 689 days.

(21) Appl. No.: 13/077,995

(22) Filed: Apr. 1, 2011

(65) Prior Publication Data
US 2012/0254191 A1 Oct. 4, 2012

(51) Int. Cl.
*G06F 17/30* (2006.01)

(52) U.S. Cl.
CPC .............. *G06F 17/30265* (2013.01)

(58) Field of Classification Search
CPC ................................ G06F 17/30265
USPC .................................................. 707/744
See application file for complete search history.

(56) References Cited

U.S. PATENT DOCUMENTS

| | | | | |
|---|---|---|---|---|
| 6,445,834 B1 * | 9/2002 | Rising, III | ........ | G06F 17/30256 382/190 |
| 6,978,274 B1 * | 12/2005 | Gallivan | ........... | G06F 17/30616 |
| 7,430,562 B1 * | 9/2008 | Bedell | ............... | G06F 17/30463 |
| 7,478,091 B2 * | 1/2009 | Mojsilovic et al. | | |
| 7,751,622 B2 * | 7/2010 | Cahill et al. | .................. | 382/181 |
| 8,843,479 B1 * | 9/2014 | Bharat | ............... | G06F 17/3071 707/724 |
| 2002/0131641 A1 * | 9/2002 | Luo et al. | ..................... | 382/218 |
| 2005/0180730 A1 * | 8/2005 | Huh | ........................ | G11B 27/28 386/290 |
| 2006/0215891 A1 * | 9/2006 | Fessler | .................. | G06T 11/005 382/128 |
| 2009/0154795 A1 * | 6/2009 | Tan | ...................... | G06K 9/6215 382/155 |
| 2009/0163183 A1 * | 6/2009 | O'Donoghue et al. | .... | 455/414.1 |
| 2009/0299999 A1 * | 12/2009 | Loui | .................. | G06F 17/30256 |
| 2011/0060983 A1 * | 3/2011 | Cai | .................... | G06F 17/30884 715/254 |

(Continued)

OTHER PUBLICATIONS

Unsupervised Learning by Probabilistic Latent Semantic Analysis, by Thomas Hofmann, 2001.*

(Continued)

*Primary Examiner* — Augustine K Obisesan
(74) *Attorney, Agent, or Firm* — Brinks Gilson & Lione

(57) ABSTRACT

A method and a system for summarizing a concept are provided. A query corresponding to a concept is received from a user. A plurality of images and corresponding descriptive information may be collected based on the query. The plurality of images and the descriptive information may be processed to form feature vectors and processed descriptive information respectively. Further, one or more topics may be identified for the plurality of images. Each of the plurality of images may be assigned with one or more topic distribution values corresponding to the one or more topics. The one or more topics correspond to the processed descriptive information. A sparse set of images may be determined based on the feature vectors and the assigned topic distribution values, to summarize the concept. Also, a target summary may be built from the summarized concept, by regularizing one or more distribution constraints.

17 Claims, 7 Drawing Sheets

(56) References Cited

U.S. PATENT DOCUMENTS

2011/0194761 A1* 8/2011 Wang ............... G06F 17/30247
                                                    382/165
2011/0264641 A1* 10/2011 Yang .................. G06F 17/3028
                                                    707/706
2012/0323738 A1* 12/2012 Gokturk et al. .......... 705/26.63

OTHER PUBLICATIONS

"Kernel Logistic Regression and the Import Vector Machine", by Zhu, 2005.*
"A classification based framework for concept summarization", Dhruv, ACM Sep. 11, 2003.*
"A multi-Class Kernal alignment method for image collection Summarization", Jorge E. Camargo, 2009.*
"Efficient Kernal Discriminant analyisis via spectral Regression" Deng Cai, 2007.*
Scene Summarization for Online Image Collections, Simon et al., Proceedings of the IEEE International Conference, 2007.*
A Novel Approach to Enable Semantic and Visual Image Summarization for Exploratory Image Search, Fan et al., pp. 358-365. MIR'08, Oct. 30-31, 2008.*

* cited by examiner

METHOD AND SYSTEM FOR CONCEPT SUMMARIZATION

FIELD OF THE INVENTION

Embodiments of the present invention relate generally to the field of concept summarization, and more specifically, to selecting images for concept summarization.

BACKGROUND

The amount of web content is vast and continuously increasing. Generally, forms of web content can include images, text and video. Currently, search engine applications on the Internet respond to a user query with results from an index of web content. The user then manually combs through the search results to find relevant web content. With the amount of web searching increasing, and being performed using devices such as mobile cell phones with limited input/output capabilities, manual aspects of search engine applications can be cumbersome and time consuming. Further, the user may wish to collect searched result to summarize a concept corresponding to the user query.

Again, with growing data content, the problem of summarization has received significant attention in the web, multimedia and computer vision communities. The summarization differs along various dimensions such as the media collection used, application information such as image features, properties and techniques that may be utilized to summarize a concept.

One possible solution is to construct such a summary manually by editors, by looking at the images and their descriptions. However, such a process for constructing the summaries is time consuming and expensive. Further, it is difficult to get an unbiased summary with such manual construction of the summaries. Also, such a process is strenuous to discover all topics or semantic aspects expressed in a large collection of images. Moreover, the process is not scalable because the number of collections and the size of each collection are too large, or different summarizations might be needed for the same concept to enable customization to user preferences.

For visual summarization, a clustering based method may find a representative set of images for each topic separately. Due to this, an image may occur multiple times in a summary over the topics. This affects 'diversity' property in the summary and is suboptimal when the summary size is small.

Further the user may be required to specify various additional constraints to summarize the concept. For example, the user may specify additional properties such as preferred topic and temporal distributions in the summary. However, no system exists in the related art to summarize the concept by considering such additional constraints that may be defined by the user.

Based on the foregoing, there is a need for a method and a system for efficiently summarizing a concept. Moreover, the summarized concept should possess properties to cover all relevant information corresponding to the concept. Furthermore, the method and the system should facilitate the user with flexibility in specifying various distribution constraints in the summarized concept.

SUMMARY

To address shortcomings of the prior art, methods, systems and computer program products are provided for improved concept summarization. For example, in response to a query for the entertainer 'Britney Spears', a set of images can be selected and outputted. An exemplary output presents results as a timeline, in one example, with each image being representative of Britney Spears for a given year.

In one embodiment, a method includes receiving a query from a user. The query corresponds to the concept. The method further includes collecting a plurality of images along with descriptive information corresponding to the plurality of images. The plurality of images being collected from a source corresponding to the query. The method further includes processing the plurality of images and the descriptive information to form feature vectors and processed descriptive information respectively. Each of the plurality of images corresponds to one of the feature vectors. Further, the method includes assigning each of the plurality of images with one or more topic distribution values corresponding to one or more topics. The one or more topics correspond to the processed descriptive information. Further, the method includes determining a sparse set of images from the plurality of images to summarize the concept, the sparse set of images being determined based on the feature vectors and the assigned topic distribution values.

In another embodiment, a system includes a receiving module, a concept collecting module, a processing module, a topic distribution module and a summarizing module. The receiving module is configured to receive a query from a user. The query corresponds to the concept. The concept collecting module is configured to collect a plurality of images along with descriptive information corresponding thereto. The plurality of images is collected from a source corresponding to the query. The processing module includes an image processing module and a text processing module. The image processing module is configured to convert the plurality of images into corresponding feature vectors and the text processing module is configured to process the descriptive information corresponding to each image of the plurality of images. The topic distribution module is configured to identify one or more topics for the plurality of images based on the processed descriptive information. Further, the topic distribution module assigns one or more topic distribution values corresponding to the one or more topics to each image of the plurality of images. The summarizing module is configured to define a sparse kernel classifier to determine a sparse set of images from the plurality of images to summarize the concept. The sparse set of images is determined based on the feature vectors and the assigned topic distribution values.

In yet another embodiment, a system includes a concept collecting module, a processing module, a topic distribution module, a summarizing module and a regularization module. The concept collecting module is configured to collect a plurality of images along with descriptive information corresponding thereto. The plurality of images and the descriptive information corresponding to the concept. The processing module includes an image processing module for converting the plurality of images into corresponding feature vectors and the text processing module configured to process the descriptive information corresponding to each image. The topic distribution module is configured to identify one or more topics for the plurality of images based on the processed descriptive information. Further, the topic distribution module is configured to assign topic distribution values of the one or more topics to each image of the plurality of images. The summarizing module is configured to define a sparse kernel classifier to determine a sparse set of images from the plurality of images to summarize the concept. The sparse set of images being determined based on the feature vectors, and the assigned topic distribution values. The regularization module is for facilitating regularization of one or more distribution constraints for building a target summary from the summarized concept.

Advantageously, the summarized concept and the target summary may include various important properties such as likelihood, diversity and balance in terms of both visual and semantic of the entire collection and coverage of the entire collection. Further, the systems and the method may utilize metadata (text description) accompanying an image to get important category information of the image. The summarization may include finding a subset of images based upon the category information of the images inferred from the metadata. Further, the target summary corresponds to additional user specified properties like topic and temporal distributions.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

Figure 1:
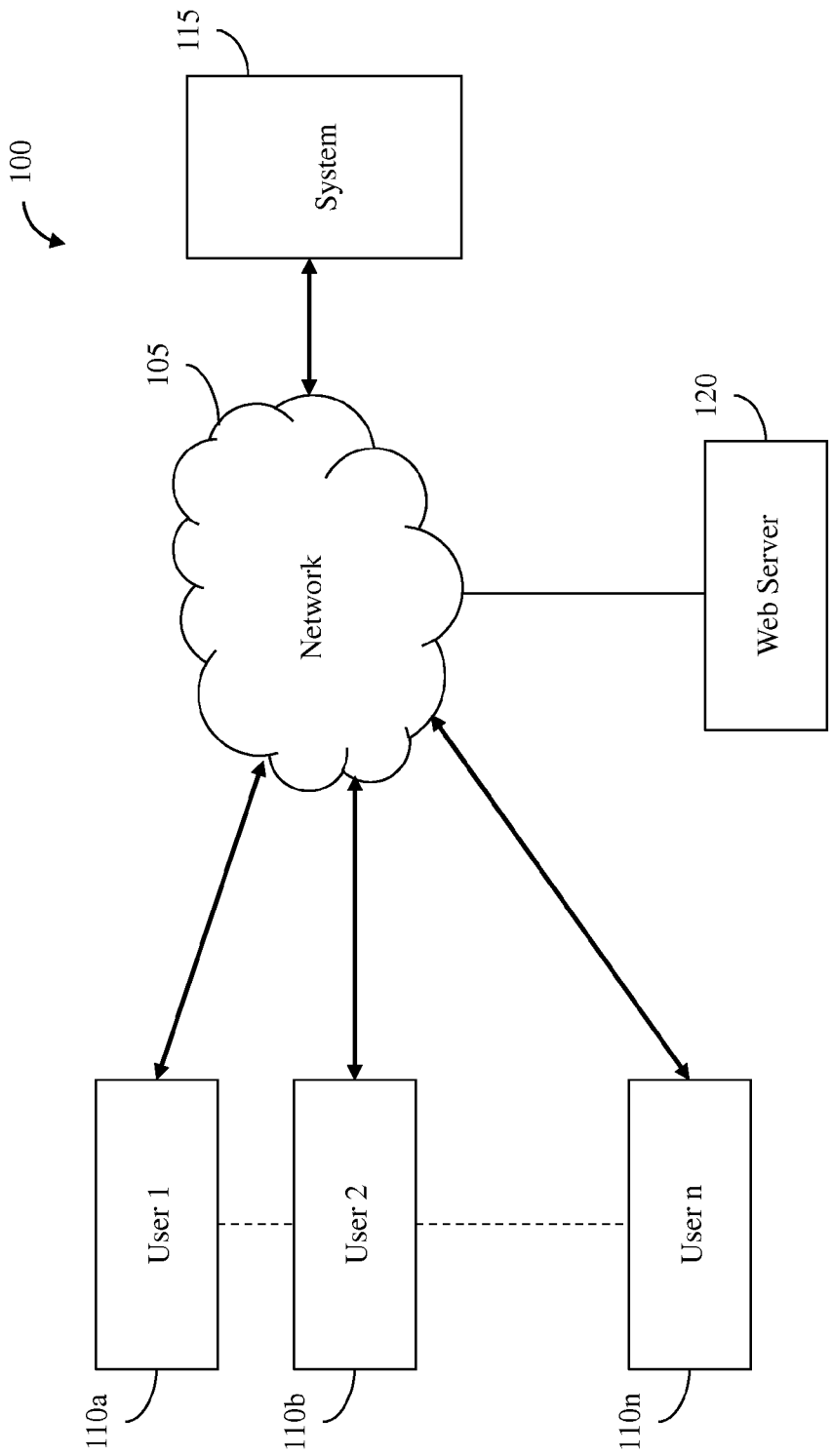
FIG. 1 illustrates a block diagram of an environment to operate a system, in accordance with various embodiments of the disclosure.

The embodiments have been represented where appropriate by conventional symbols in the drawings, showing only those specific details that are pertinent for understanding the embodiments of the present invention so as not to obscure the disclosure with details that will be readily apparent to those of ordinary skill in the art having the benefit of the description herein.

DETAILED DESCRIPTION OF THE EMBODIMENTS

The present disclosure describes a method, system and computer program product for summarizing a concept. The following detailed description is intended to provide example implementations to one of ordinary skill in the art, and is not intended to limit the invention to the explicit disclosure, as one or ordinary skill in the art will understand that variations can be substituted that are within the scope of the invention as described.

Generally, a concept can be summarized by providing a relevant set of images from a plurality of images corresponding to the concept. A summary is created by utilizing additional information, accompanying each image, in the form of metadata. A summary size may define a number of images presented in a summarized set. Also, various aspects of the concepts may be discovered to create a set of selected images for summarizing the concept. The images may be selected according to one or more criteria. Further, the summary may satisfy important properties such as coverage, diversity and balance. Furthermore, some embodiments of the present disclosure allow users to specify desired distributions over category, time etc, that a summary should satisfy. In an embodiment, the summaries may be prepared on three broad types of concepts such as current affairs, travel and celebrities.

For example, results to a query for the city of 'San Francisco' can include images of landmarks such as the 'Golden Gate Bridge' and 'Alcatraz'. In another example, results to a query for the activity "ski San Francisco" can include images of local ski resorts and a famous skier from the city. Resulting images can be outputted in various design-specific manners. In an implementation, a slideshow (e.g., a Power Point file or a Flash file), a timeline, a graph, or a gallery can be presented.

FIG. 1 illustrates a block diagram of an environment 100, in accordance with various embodiments of the disclosure. The environment 100 includes a network 105, one or more user systems (electronic devices) such as user 1 110a, user 2 110b . . . to user n 110n (hereinafter collectively referred to as "users 110"), a system 115 and a web server 120. The users 110 may be communicably coupled to the system 115 through the network 105. The network 105 may include, but is not restricted to, a Local Area Network (LAN), a Wireless Local Area Network (WLAN), a Wide Area Network (WAN), Internet, and a Small Area Network (SAN). The one or more user systems (such as 'users 110') may include one or more electronic devices that may be utilized by one or more users. It may be apparent to any person having ordinary skills in the art that, in this disclosure, references to user systems (users 110) may be used to refer to the users utilizing the user systems and such references may interchangeably be used for both (user systems and the users utilizing the user systems) in this disclosure for the sake of clarity. Further, the web server 120 may include an electronic device that may be in electronic communications with the users 110 and the system 115 through the network 105. In one embodiment, the system 115 and the web server are processor-based devices that execute source code of a computer program product. The devices can be a personal computer (PC), smart phone, a commercial server or any other processor-based device. In general, the devices include a persistent memory, non-persistent memory and input/output ports (not shown).

The users 110 provide an input to the system 115 for summarizing a concept. The users 110 may provide a query or concept, as the input, for which summarization is required. Further, the system 115 may be provided with information corresponding to a source from where the concept collection may be obtained for summarizing the concept. In an embodiment, the source may be provided by content creators (other users) such as administrator, editors and the like. Such content creators may find the sources corresponding to various concepts to get various relevant images (corresponding to the concepts) therefrom. Such images may then be stored in database for future references and usage. For example, the content creators may build a collection for the recent political situation at 'Libya'. Such collection may be stored in a database. Further, if the user visits a news page (such as Yahoo news page), he may be proactively shown the collection, such as the situation in 'Libya', as one of the most buzzing news stories in recent times.

The source may include one or more web pages that may be extracted from the web server 120 to extract the plurality of images along with descriptive information corresponding thereto. For example, if the query (concept) is related to 'travel', then the plurality of images may be collected along with descriptive information from the source like Flickr by utilizing the web server 120. Similarly, for the query related to celebrities and current affairs, internal search indices of RSS feeds from sites, corresponding to movies and news, may be utilized to extract the plurality of images. In an embodiment, the source may be local to the user systems.

Further, the system 115 provides a sparse set of images to summarize the concept by utilizing the input. The system 115 is explained further, in more details, in conjunction with FIG. 2A and FIG. 2B.

Figure 2A:
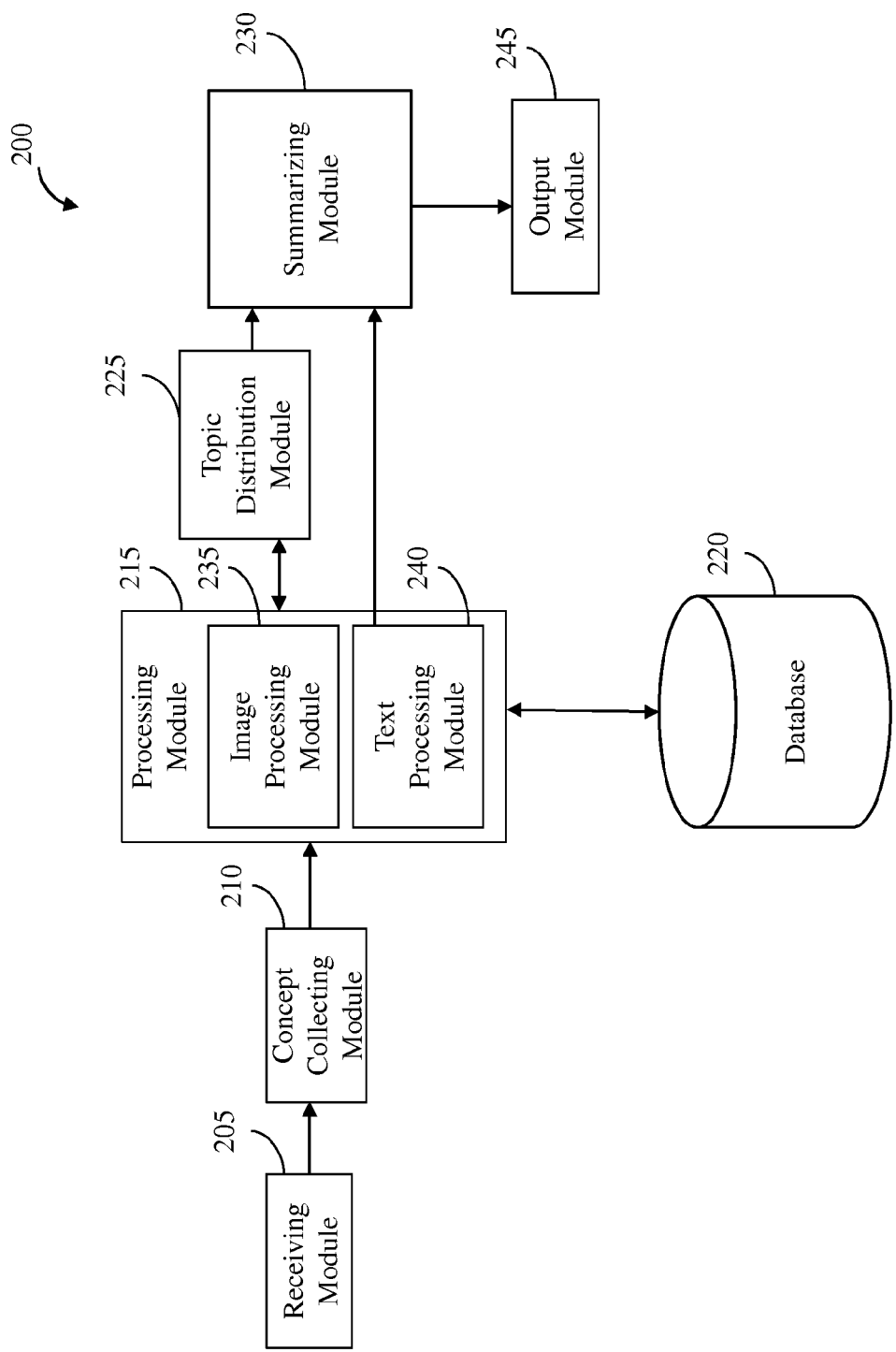
FIG. 2A and FIG. 2B illustrates block diagrams of a system for summarizing a concept, in accordance with two different embodiments of the disclosure.
Figure 2B:
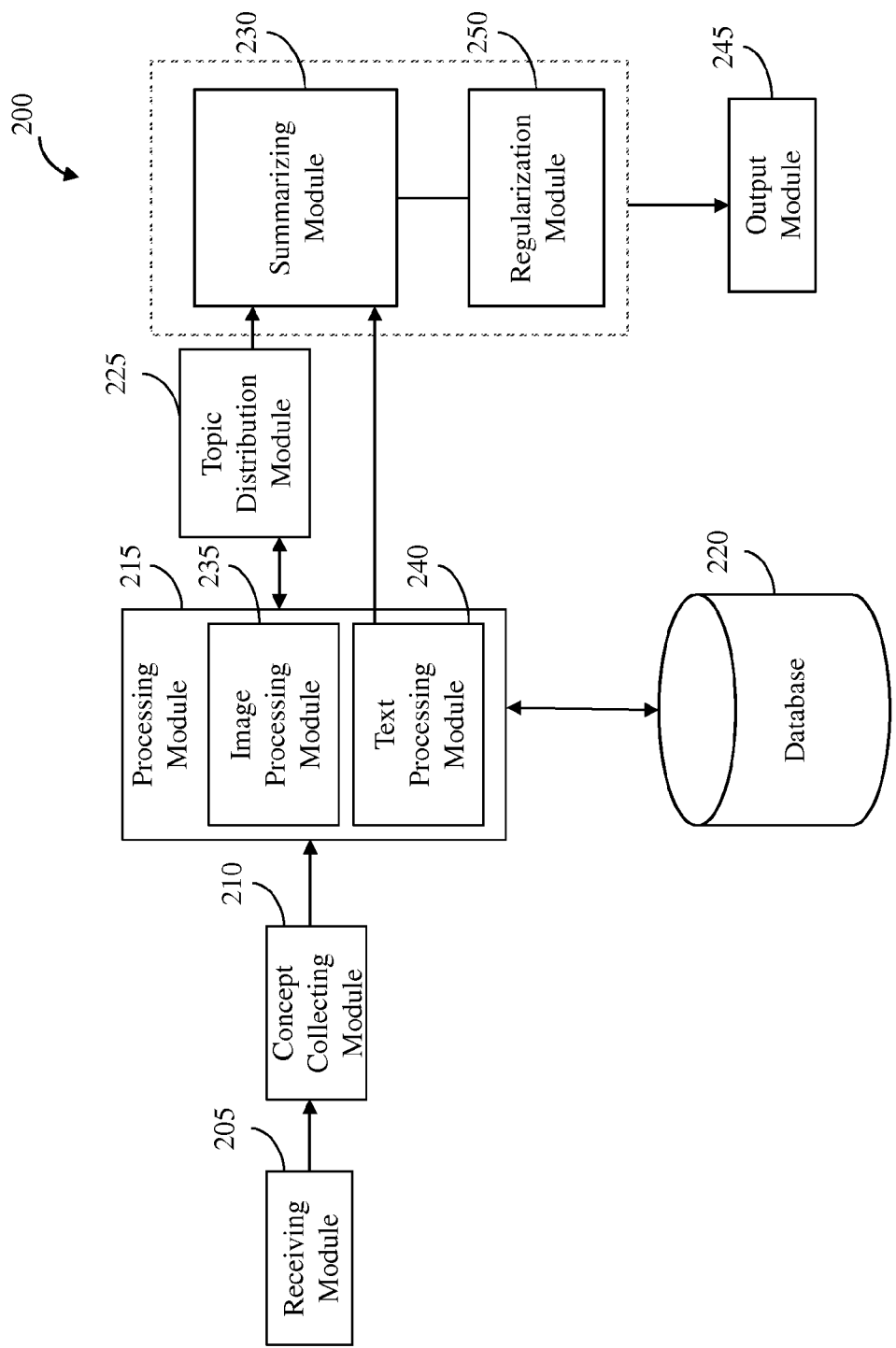

FIG. 2A and FIG. 2B illustrates block diagrams of a system for summarizing a concept, in accordance with two different embodiments of the disclosure. Further, most of the components of FIG. 2B are present in the FIG. 2A, thus FIG. 2A and FIG. 2B are explained together in conjunction and the explanation of such components is not repeated here for the sake of brevity.

In an embodiment, the system 200 is an online system that is accessible by a user through a network, such as Internet (as explained earlier in conjunction with FIG. 1). As shown in FIG. 2A and FIG. 2B, the system includes a receiving module 205, a concept collecting module 210 communicably coupled to the receiving module 205, a processing module 215 communicably coupled to the concept collecting module 210, a database 220 communicably coupled to the processing module 215, a topic distribution module 225 communicably coupled to the processing module 215, a summarizing module 230 communicably coupled to the topic distribution module 225, and an output module 245. Further, in FIG. 2B, the system 200, additionally, includes a regularization module 250 communicably connected to summarizing module 230. The output module 245 is communicably coupled to the summarizing module 230, as shown in the FIG. 2A and in FIG. 2B the output module 245 is communicably coupled to the summarizing module 230 and the regularization module 250.

In one embodiment, the receiving module 205 receives a query from a user. The query may correspond to the concept to be summarized. The concept may be summarized by searching a plurality of images corresponding to the concept and providing the set of most relevant images from the plurality of images to the user. Further, in one embodiment, the receiving module may also receive information corresponding to a source for collecting a plurality of images (corresponding to the concept) therefrom. In an embodiment, the query may correspond to at least one of concepts such as Celebrities, Travel and Current Affairs. Further, the query may vary from a precise concept such as 'Angelina Jolie', 'San Francisco' to more general concept such as 'Oil Spill' and polysemic query such as 'Jaguar'. Further, the source may correspond to the query. For example, if the query corresponds to 'Celebrities', the source may correspond to various websites corresponding to movies, news, social gathering, parties and the like.

Further, the concept collecting module 210 may collect a plurality of images along with descriptive information corresponding thereto. The concept collecting module 210 may collect the plurality of images and the corresponding descriptive information from the source. For example, for travel related concepts like San Francisco, the concept may be collected from flickr (http://www.flickr.com), Yahoo! Images, or the like. Similarly, for queries related to Celebrities and Current Affairs, the internal search indices of Media RSS (MRSS) feeds may be utilized from various sites such as Yahoo! (e.g., http://news.yahoo.com, http://omg.yahoo.com, http://movies.yahoo.com, and the like), news web sites, or a Movie Database. In one implementation, as set of application programming interfaces (APIs) are used by the concept collecting module 210 to send requests and receive responses from a corresponding source.

The concept collecting module 210 may include one or more adapters for different sources. Each adapter may be designed for one specific source. An adapter may query respective search index and get the concept collection (I, T). Here, 'I' denotes plurality of images and 'T' denotes descriptive information corresponding to 'I'. The descriptive information may include metadata or textual information (hereinafter may be referred to as 'textual metadata') corresponding to an image that may be extracted by the adapters. Hereinafter, an image and its descriptive information may alternatively be referred to as 'object'.

Further, the nature of the descriptive information extracted by the adapters may vary for each concept type. For example, for a query related to 'Current Affairs', an adapter from the one or more adapters, may extract the textual metadata from caption and title of the corresponding image. The adapter may extract the textual metadata from the source of 'Current Affairs'. For a query related to 'Travel', an adapter may extract the text tags from the tag section from a source corresponding to 'Travel'. Similarly, for a query related to 'Celebrities', an adapter may extract captions and teasers as the metadata from the source related to 'Celebrities'. The extracted concept collection (I, T) from these adapters may be provided to the processing module 215.

The processing module 215 includes an image processing module 235 and a text processing module 240. The image processing module 235, in one embodiment, converts the plurality of images 'I' into corresponding feature vectors 'X'. In an embodiment, the image processing module 235 may utilize a Convolutional Neural Network (CNN) to represent each image 'Ii' of the plurality of images 'I' as a feature vector 'xi' in a low-dimensional space. Further, in an embodiment, the image processing module 235, may utilize Deep Belief Networks (DBNs) to train an auto-encoder network that may reconstruct the original image from the low-dimensional representation of feature vector 'xi', of each image, with minimum error.

The text processing module 240 is configured to process the descriptive information corresponding to each image of the plurality of images. The descriptive information (textual metadata) may be cleaned (processed) using standard techniques like removal of stop-words, words with very low and high frequency, etc. For example, the descriptive information such as a title of an image may be processed by removing common words such as articles therefrom. In an embodiment, the text processing module 240 may use a bag of words to represent text data.

Further, the processed objects such as processed image (from the image processing module 235) and corresponding processed descriptive information (from the text processing module 240) may be stored in the database 220. The processed objects that are stored in the database 220 may be reused for further processing of any descriptive information.

The system 200 may utilize a classification based framework that requires topic distributions Q. The topic distribution module 225 may identify one or more topics for the plurality of images based on the processed descriptive information. The topic distribution module 225 may perform a latent semantic analysis of the processed descriptive information to identify the one or more topics. In an embodiment, the topic distribution module 225 performs Latent Dirichlet Analysis (LDA) on the bag of words (containing descriptive information 'T') to identify the one or more topics and topic distribution for each image.

Further, the topic distribution module 225 may assign one or more topic distribution values corresponding to the one or more topics to each image of the plurality of images. The topic distribution module 225 may determine one or more topic distribution values of the one or more topics corresponding to each image. Each of the topic distribution values may include a probability value for assigning a corresponding topic to an image of the plurality of images. In an embodiment, the probability values of the one or more topics distribution to the image is in the range of '0' and '1'. Further, summation of the overall topic distribution values for the one or more topics for the image is equal to '1'.

In an embodiment, each of the one or more topics may be treated as one category. An image may belong to at most '2' or '3' categories. Therefore, the topic distribution module 225 may set a hyper-parameter in a way to give a sparse distribution of topics per image. The topic distribution of $i^{th}$ image (Ii) may be represented as qi.

The summarizing module 230 may receive topic distribution values from the topic distribution module 225 and the feature vector (xi) for each image. The summarizing module 230 may define a sparse kernel classifier to determine a sparse set of images (Is) from the plurality of images (I) to summarize the concept. Thus, Is ⊂ I for some S ⊂ {1, ..., N} with a user specified value for |s|, where |s|<<N. The sparse set of images may be determined based on the feature vectors (X) and the assigned topic distribution values (Q).

It will be apparent to a person skilled in the art that in kernel classifiers literature, a kernel classifier decision function f(x) in a binary classification problem may be represented as a linear combination of a set of base functions, i.e. $f(x) = \Sigma_{i=1}^{N} a_i k(x, x_i)$. Here, each $k(x, xi)$ and $a_i$ is referred as a basis function and its coefficient respectively.

The summarizing module 230 may utilize a kernel basis function, i.e., $$K(x; xi) = \exp\left(-\frac{\|x - x_i\|}{2\sigma^2}\right).$$

Here, $\sigma^2$ is a kernel width parameter. Further, it may be observed empirically that the sparse kernel classifier decision function defined as:

$\hat{f}(x) = \Sigma_{i \in s} a_i k(x, x_i)$.

Also, it may be appreciated by any person having ordinary skill in the art that the sparse kernel classifier decision function may achieve classification accuracy closer to that achievable by the full model f(x), when summary set 'S' is carefully chosen according to some suitable criterion.

Further, the summarizing module 230 may utilize multiple functions such as f(x) (as mentioned above) to address multi-class problem for summarizing a concept. The summarizing module 230 may utilize probabilistic kernel models to incorporate the topic distribution information Q received from the topic distribution module 225 in a probabilistic framework to summarize the concept. Further, the output module 245 may provide (display) the summary set 'S' (summarized concept) to the user.

In an embodiment, the summarizing module 230 may summarize the concept based on one or more users' defined requirements (constraints). The summarizing module 230 may regularize the one or more distribution constraints in building a target summary. The distribution constraints may be understood more clearly in conjunction with description of the regularization module 250 (as shown in FIG. 2B).

Further, in the FIG. 2B, the system 200 may utilize the regularization module 250 to provide flexibility in selecting a subset (from the plurality of images), to summarize the concept, based on one or more users' defined requirements. For example, while looking for the summary images of Angelina Jolie, the user may be interested in looking at her recent images, older images or images that nicely span over a specified time interval. Similarly, for the concept Oil Spill, the user may want to include more images, in a target summary, that represent political aspects than others. For example, the user may be interested in including more images for political news related to Oil Spill. The system 200 may allow the user to specify such desired distribution constraints in the summary. Further, the regularization module 250 may facilitate regularization of one or more distribution constraints for building a target summary from the summarized concept. Here, the term 'target' summary refers to the summary of the concept based on the one or more distribution constraints. In an embodiment, the summarizing module 230 may receive the distribution constraints from the regularization module 250 to produce the target summary based on the distribution constraints. Further, the one or more distribution constraints may be regularized by utilizing a regularization term to minimize divergence between the summarized concept and the target summary. In an embodiment, if the user does not specify any distribution constraints, then the summary of the concept may be considered as the target summary.

In an embodiment, the summarizing module 230 may further perform the functionality of the regularization module 250. In this embodiment, the summarizing module 230 may regularize the one or more distribution constraints to build the target summary from the summarized concept. Further, in this, the block 250 for 'regularization module' may be removed. Thus, the summarizing module 230 and the regularization module 250 may be understood in combination or separately. Further, the summarizing module 230 and the regularization module 250 may be understood more clearly when read in conjunction with the explanation of FIG. 3, FIG. 4 and FIG. 5.

The output module 245 may provide the target summary built from the at least one of the summarizing module 230 (as explained above in conjunction with FIG. 2A) and the regularization module 250 (as explained above in conjunction with FIG. 2B). In an embodiment, the output module 245 may display the target summary to the user on the user's system. The user's system may be understood in conjunction with the description of FIG. 1. For example, if the user has provided the inputs to the receiving module 205 corresponding to 'Oil Spill', the output module 245 may display a set of images with the descriptive information corresponding to the set of images to the user.

Figure 3:
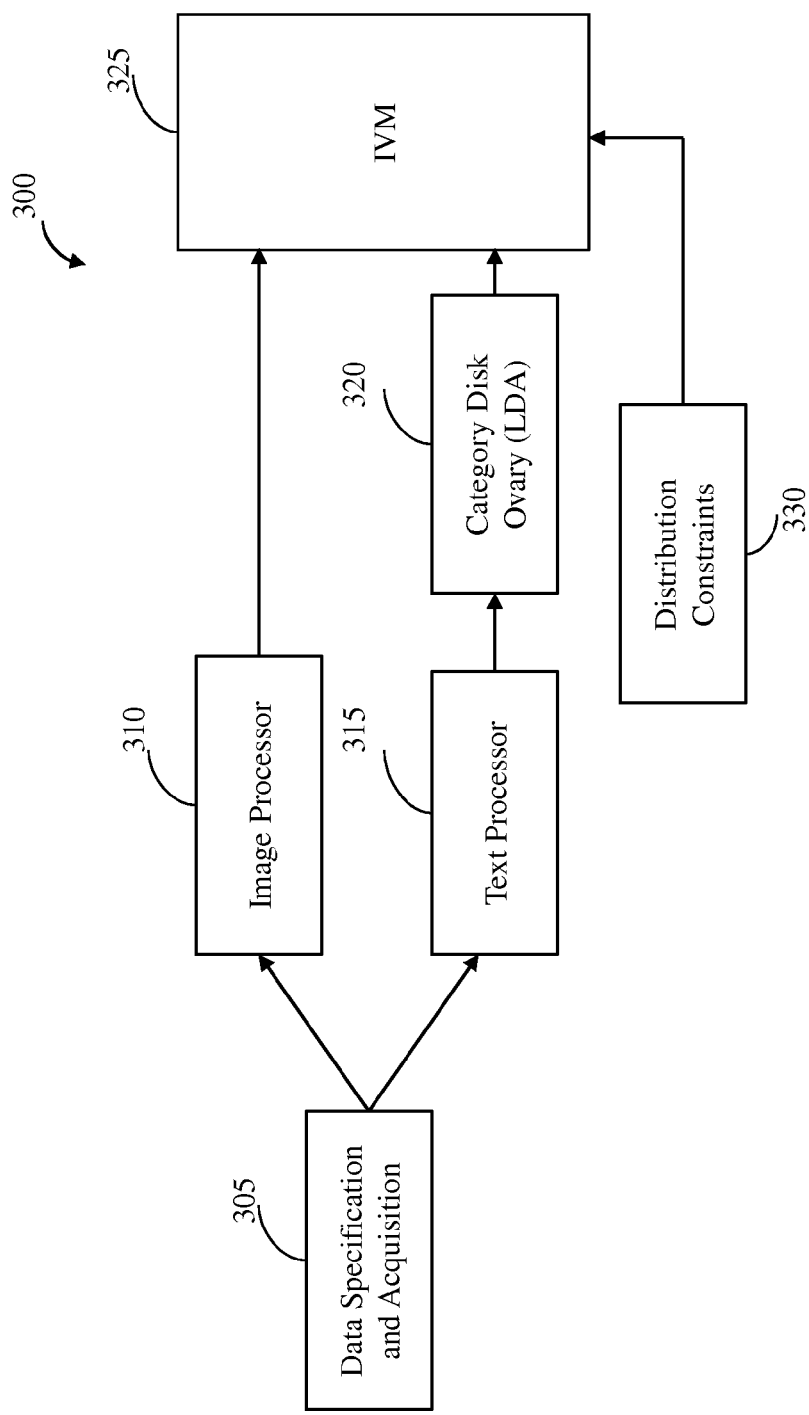
FIG. 3 illustrates an exemplary system for summarizing a concept, in accordance with an embodiment of the disclosure.

FIG. 3 illustrates an exemplary system 300 for summarizing a concept, in accordance with an embodiment of the disclosure. The system 300 is explained in conjunction with the explanation of FIG. 2.

The system 300 includes a block 305 for data specification and acquisition. The block 305 depicts a step of specifying inputs for a concept collection (I, T) pertaining to a concept. The inputs may include, but are not restricted to, a query or concept and at least one source. The source may include a place to collect the concept collection therefrom. For example, for 'Travel' related concepts like San Francisco, the concept may be collected from flicker. In one embodiment, the query may be provided by a user and source may be provided by one or more content creators (other users) such as admin user, editors and the like.

Further, on receiving the query from the user, a fetch phase may be initiated and mediated through various adapters for concept collection. Here, the 'concept collection' may refer to a step of collecting a plurality of images along with descriptive information corresponding to the plurality of information. The plurality of images and the descriptive information correspond to the concept. Each adapter may be designed for one specific source to query respective search index and get the concept collection (I, T) therefrom. Hereinafter, an image and its description, in combination, may alternatively be referred to as an 'object'.

The descriptive information may include metadata or textual information corresponding to the plurality of images extracted by the adapters. Further, the nature of metadata or textual information extracted by the adapters may vary for each concept type. For example, for the query related to 'Current Affairs', an adapter may extract the textual metadata from the caption and title and for the query related to 'Travel', adapter may extract the text tags from the tag section corresponding to an image.

The extracted concept collection, from these adapters, may be provided to a processing stage, such as processing module 215, as explained earlier in conjunction with FIG. 2. Specifically, the collected concept may be provided to an image processor 310 and a text processor 315.

The image processor 310 may convert the plurality of images 'I' to a plurality of feature vectors X. The image processor 310 may utilize a Convolutional Neural Network (CNN) to represent each image Ii as a feature vector xi in a low-dimensional space. Deep Belief Networks (DBNs) train an auto-encoder network that can reconstruct the original image from the low-dimensional representation with minimum error.

The text processor 315 may utilize a bag of words to represent the text data (descriptive information). The descriptive information collected at block 305 may be processed using standard techniques like removal of stop-words, words with very low and high frequency, etc. the processed descriptive information along with corresponding image(s) (objects) may be stored in a database. The stored objects (I, T) may be re-used for future concept summarizing.

The processed descriptive information may be provided to topic distributor 320 for providing topic distribution (Q) to the plurality of images. The topic may be distributed automatically by using LDA. In one implementation, LDA is performed on the bag of words (containing processed descriptive information) to provide the topic distribution (qi) for each image. Thus, the topic distribution qi of Ii is the topic distribution of the $i^{th}$ object obtained from LDA. Further, each topic generated by the LDA may be treated as one category.

In an embodiment, an image may belong to at most 2 or 3 categories. Therefore, the LDA hyper-parameter may be set in such a way that LDA gives a sparse distribution of topics per image. For example, $\alpha$ may be considered as '0.1' and $\beta$ may be taken as '0.01'. Here, the parameter $\beta$ controls the sparsity of distribution for each topic.

The number of topics may be specified depending on the concept collection (I, T) at hand. In an exemplary embodiment, if the collected concept I=(I1, I2 . . . In) and T=(T1, T2 . . . Tn) denote a collection of images 'I' with respective descriptions 'T'. This collection of images may be provided to the image processor 310 to convert the images into the feature vectors. Suppose, X=(xi: i=1, 2 . . . n) is a feature representation of I. Further, LDA may discover the semantic topics from 'T'. Suppose, if LDA discovers 'M' number of topics, and assigns a distribution of topics to each image based on its description.

The topic distributions of the image collection 'I' may be denoted as:

Q={qi: i=1, 2 . . . n} where qi={qi, 1, . . . qi, M} is the topic distribution of the $i^{th}$ image. Each image may belong to very few topics and in the extreme case it may belong to just one topic. Therefore, qi may be sparse. Thus, in the extreme case, qi, j=1 when j=j' for some topic j', and 0 otherwise. Further, each topic may be considered as a class and qi as the class probability distribution over a set of classes C={c1, c2 . . . cM).

i.e., $P(c_j|x_i)=q_{i,j}$; Here, $i=1, \ldots, N$; $j=1, \ldots, M$.

The image and class (topic) distribution pair may be provided to Import Vector Machine (IVM) 325 to find a sparse set of images 'Is' to summarize the concept. The sparse set of images 'Is' is a subset of the plurality of images 'I'. The concept may be summarized for some '|S|'. Here, '|S|' denotes a size of the summary that defines the number of images to be provided in the sparse set of images to summarize the concept.

The IVM 325 may be utilized as a sparse kernel classifier and provide the concept summary having image summary Is and the corresponding description Ts. Here, Is={Ii:i∈S} and Ts={Ti:i∈S}. Thus, the image summary (Is) is a subset of the plurality of images having summary size 'S'.

Suppose, 'Yi' be a binary vector with only one non-zero element, and the components are defined as: 'yi,m'. Here, 'm' belongs to 1, 2, . . . M and 'ci' denotes the class label of the $i^{th}$ image. Then, Kernel Logistic Regression (KLR) optimization problem for a multi-class classification problem can be written as:

$$\min_{a} -\frac{1}{N}\sum_{i=1}^{N} y_i, c_i \log(P(c_j|x_i)) + \frac{\lambda}{2}\sum_{m=1}^{M} a_{:,}^T mKa_{:,}m \quad (1)$$

$$P(c_j|x_i) = \frac{e^{f_j(x)}}{\sum_{m=1}^{M} e^{f_m(x)}}, f_m(x) = \sum_{i=1}^{N} a_{i,m}k(x, x_i) \quad (2)$$

Here, $(i, j)^{th}$ entry of the matrix K is given by k(xi, xj). Further, a, m denotes the coefficient vector of the $m^{th}$ classifier, $f_m(x)$.

The KLR model may provide a natural estimate of probability such that an example xi belongs to class cj as depicted in equation (2). Further, to find a subset of example 'S', the equation (2) may be modified as follows:

$$\hat{f}_m(x) = \Sigma_{i \in s} a_{i,m} k(x, x_i); \; m=1, \ldots, M \quad (3)$$

Thus, equation (2) may be substituted with equation (3) and accordingly, P ($c_j|x_i$) may be replaced with $\hat{P}(c_j|x_i)$. Therefore, the objective function (equation (1)) may be rewritten as follows:

$$\min_{S,a} -\frac{1}{N} \sum_{i=1}^{N} y_i, c_i \log(\hat{P}(c_j|x_j)) + \frac{\lambda}{2} \sum_{m=1}^{M} a_{\cdot}^T, mKa_{\cdot}, m \quad (4)$$

It can be appreciated by any person skilled in the art that the subset 'S' may include import vectors corresponding to images of the concept summary. Thus, an output from the IVM 325 may include the concept summary (IS, TS). Further, in an embodiment, the probability distribution qi (instead of yi) may be utilized. In this case, more than one class may have nonzero values. To handle this, the equation (4) may be extended to the following:

$$\min_{S,a} -\frac{1}{N} \sum_{i=1}^{N} \sum_{j=1}^{M} q_{i,j} \log(\hat{P}(c_j|x_i)) + \frac{\lambda}{2} \sum_{m=1}^{M} a_{\cdot}^T, mKa_{\cdot}, m \quad (5)$$

The first term is equivalent to minimizing Kullback-Leibler (KL) divergence between the target distribution qi=[qi,1 qi,2 ... qi,M] and the model distribution p(xi)=[pi,1 pi,2 ... pi,M] induced by the KLR model. Thus, the classifier model is built to predict the topic distribution of an image. The second term is a regularization term. Further, the equation (5) is a combinatorial optimization problem in S. Thus, the IVM 325 may utilize a greedy algorithm to find 'S'. The greedy algorithm is explained further in conjunction with FIG. 4.

The subset 'S' may satisfy various common properties using IVM 325. Further, the system 300 may provide flexibility to a user to specify some additional requirements for categorical or temporal distributions of the images. For example, while looking for the summary images of Angelina Jolie, the user may be interested in looking at her recent images, older images or images that nicely span over a specified time interval. Such constraints may be specified by distribution constraints 330. The distribution constraints 330 may be provided as the user specified constraints to the IVM 325. Further, the IVM 325 may utilize distribution constraints 330 to incorporate additional user specified constraints in the summary, as additional regularization terms in an objective function. Thus, the generated concept summary (represented by 'S') may be required to meet some specified requirements with respect to categorical or temporal distributions of the images. In one embodiment, a target summary may be created, from the summarized concept, by meeting the specified requirements of the user.

The system 300 may specify such desired distributions in the summary to create a target summary. For example, 'Pt' denotes a target distribution over the categories that the summary may satisfy. Thus, $$Pt(j) = \frac{1}{K} \sum_{i \in S} q_{i,j}, \text{ where } j = 1, \ldots, M \quad (6)$$

The right hand side of the equation (6) represents the class distribution of the summary.

In one embodiment, with these equality constraints, the equation (5) may be solved as a constrained optimization problem. Alternatively, in another embodiment, these constraints may be converted into a regularization function to solve a modified unconstrained optimization problem. In this, a KL-divergence based regularization term may be added to the objective function (equation (5)). The KL-divergence based regularization term may be defined as:

$$\eta KL\left(Pt(c), \frac{1}{K} \sum_{i \in S} q_i\right) \quad (7)$$

The KL-divergence based regularization term may be utilized to minimize the divergence between the target distribution Pt(c) and distribution of the summary. Here, 'η' may control the contribution of the KL-divergence based regularization term.

It may be appreciated by any person skilled in the art that the newly added KL-divergence term (as shown in the equation (7)) is not dependent on 'a'. Therefore, optimization of 'a' in the equation (5) may remain the same as before. This term (equation (7)) may play a role in the selection of the vector after 'a' is optimized with the inclusion of each vector.

Further, it can be appreciated by any person skilled in the art that the distribution constraint may be utilized, to ensure coverage, even in case the number of images in one of the classes is small. This may be done by assigning a non-zero probability to such a class in the target distribution Pt.

Figure 4:
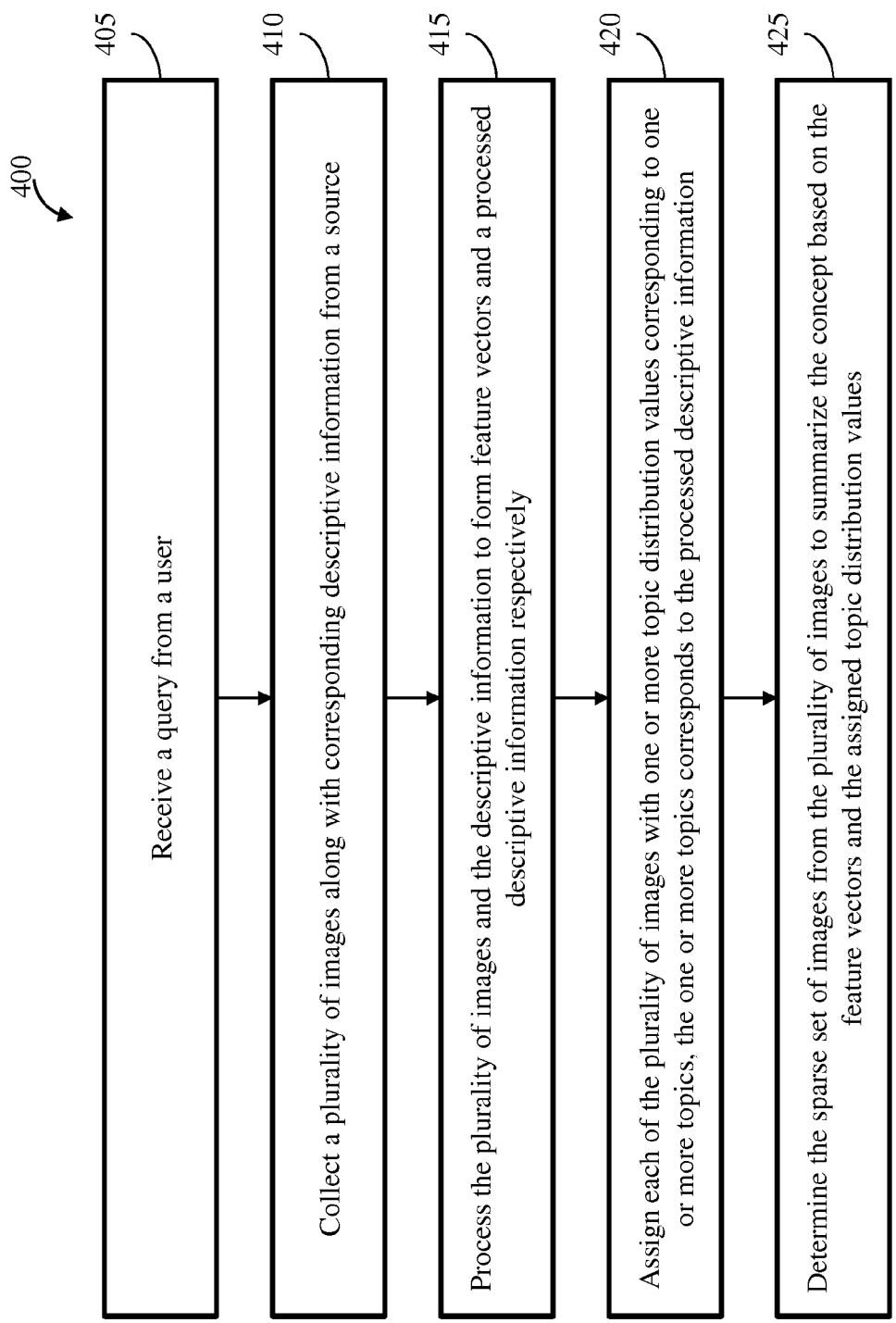
FIG. 4 is a flowchart illustrating method for summarizing a concept, in accordance with an embodiment of the disclosure.

FIG. 4 is a flowchart illustrating method 400 for summarizing a concept, in accordance with an embodiment of the disclosure. The order and number of steps in which the method 400 is described is not intended to be construed as a limitation.

At step 405, a query is received from a user. The query may correspond to the concept. For example, the user may provide a search query related to a concept. The concepts may include, but is not restricted to, 'travel', 'celebrities' and 'current affairs'. In one embodiment, the source may also be received for collecting the plurality of images. The source may be provided by content creators (other users) such as admin users, editors and the like.

At step 410, a plurality of images may be collected along with corresponding descriptive information from the source. The plurality of images collected may correspond to the query. In an example embodiment, the descriptive information includes metadata or textual information corresponding to each image. Each image and corresponding description may be referred to as an 'object'. The nature of metadata or textual information collected may vary for each concept type.

At step 415, the plurality of images (I) and the descriptive information (T) may be processed to form feature vectors (X) and a processed descriptive information respectively. Each of the plurality of images corresponds to one of the feature vectors. Each of the plurality of images (Ii) may be represented as a feature vector (Xi) in a low dimensional space. Further, the descriptive information corresponding to each of the plurality of images may be processed using standard techniques like removal of stop-words, words with very low and high frequency, etc.

At step 420, each of the plurality of images (Ii) may be assigned with one or more topic distribution values (Q) corresponding to one or more topics. The one or more topics correspond to the processed descriptive information. In an embodiment, one or more topics are determined by performing Latent Dirichlet Analysis (LDA) (hereinafter referred to as 'LDA') on the descriptive information 'T'. Each topic determined by LDA may be considered as one category. Thus, the topic distribution qi of Ii is the topic distribution of the $i^{th}$ object obtained from LDA. Further, an image may be expected to belong to at most 2 or 3 categories. Therefore, the LDA hyper-parameter 'α' may be set in such a way that LDA may give a sparse distribution of topics per image.

The one or more topic distribution values (Q) may include probability values for assigning the corresponding topic to an image of the plurality of images.

At step 425, a sparse set of images, from the plurality of images, may be determined to summarize the concept. The sparse set of images may be determined based on the feature vectors and the assigned topic distribution values. Further, a summary size 'L' may be utilized for determining the sparse set of images to summarize the concept. In an exemplary embodiment, the category distribution (topic distribution) (Q) along with the image feature vectors 'X' for all objects (images and corresponding descriptive information) may be given as input with the summary size 'L' to a greedy algorithm for subset selection (Algorithm 1). The greedy algorithm is explained, as follows, in conjunction with FIG. 2 and FIG. 3.

Data Given:
Class distributions, {qi,j, i=1, . . . , N, j=1, . . . , M}
Image features X={xi, i=1, . . . N}
Distribution over categories Pt, if applicable
Number of Summary Images L=|S|
Regularization parameters λ and η

Result:
Subset S of indexes of the import vectors or summary images

| | |
|---|---|
| 1) | Begin |
| | Initially, the subset 'S' may have null value |
| 2) | I.e. S ← φ |
| 3) | for k ← 1 to L do |
| 4) | $\overline{S} \leftarrow \frac{\{1, ..., N\}}{S}$ |
| 5) | for i ∈ $\overline{S}$ do |
| 6) | Construct $S_i$ ← S∪{i} |
| 7) | Set S to Si in Equation 5 and optimize for the coefficients a |
| | using Gradient Descent algorithm |
| 8) | Ei ← optimized objective function value in Equation 5 |
| 9) | if Distribution constraint is applicable then |
| 10) | $Ei \leftarrow Ei + \eta KL\left(Pt(c), \frac{1}{K}\sum_{i \in S} q_i\right)$ |
| 11) | end |
| 12) | end |
| 13) | s ← argmin$_{i \in \overline{S}}$Ei |
| 14) | S ← S∪{s} |
| 15) | End |
| 16) | end |

In one embodiment, the method of subset creation at step 425, utilizes the Gaussian kernel K(xi; xj) which is calculated using the formula:

$$k(x; xi) = \exp\left(-\frac{\|x - x_i\|}{2\sigma^2}\right).$$

Here, the parameter σ controls the influence of the import vectors over the feature space (as shown in equation (2) in description of FIG. 3). In one implementation, with the CNN features, a value of 'σ' in the range 2-3 is preferred. Also, the regularization parameter 'λ' may be set to a value in the range [0:001-0:0001]. To compute the change in the value of the objective function (equation (5)), as the method iterates through the loop in step 3 (Algorithm 1), the coefficients 'a' may need to be optimized using some nonlinear optimization routine (step 7 in Algorithm 1). This may be done by utilizing the standard non-linear conjugate gradient descent method.

To reduce the computational complexity of the import vector selection stage (steps 5-13), the method 400 may perform a coarse optimization by limiting number of line searches, function and gradient evaluations in the optimization algorithm (step 7). Once an import vector is selected, a finer optimization of 'a' may be performed (step 15) by allowing more number of line searches, function and gradient evaluations.

Further, in an embodiment, one or more distribution constraints (Pt) may also be specified if required by a user. The distribution constrained may be applied in steps 9-11. Here, $$`\eta KL\left(Pt(c), \frac{1}{K}\sum_{i \in S} q_i\right)`$$

represents KL-divergence based regularization term (as explained earlier in conjunction with FIG. 3). By using such specified constraints, the method 400 may generate the concept summary (IS; TS) pertaining to the topic. It may be appreciated by any person skilled in the art that the generated summary may be indexed separately, and may be utilized for any further search.

In an exemplary embodiment, the overall computational complexity for selecting L summary images is O ($L^2N^2C$). For a dataset with 500 images and 25 topics, the whole process can take, for example, approximately 15 minutes on a Linux-based processing machine with, e.g., 4 Intel Xeon 2.33 GHz (dual core) processors and 4 GB RAM. The 'Algorithm 1' may be made scalable to large datasets with millions of images through various ways.

Figure 5:
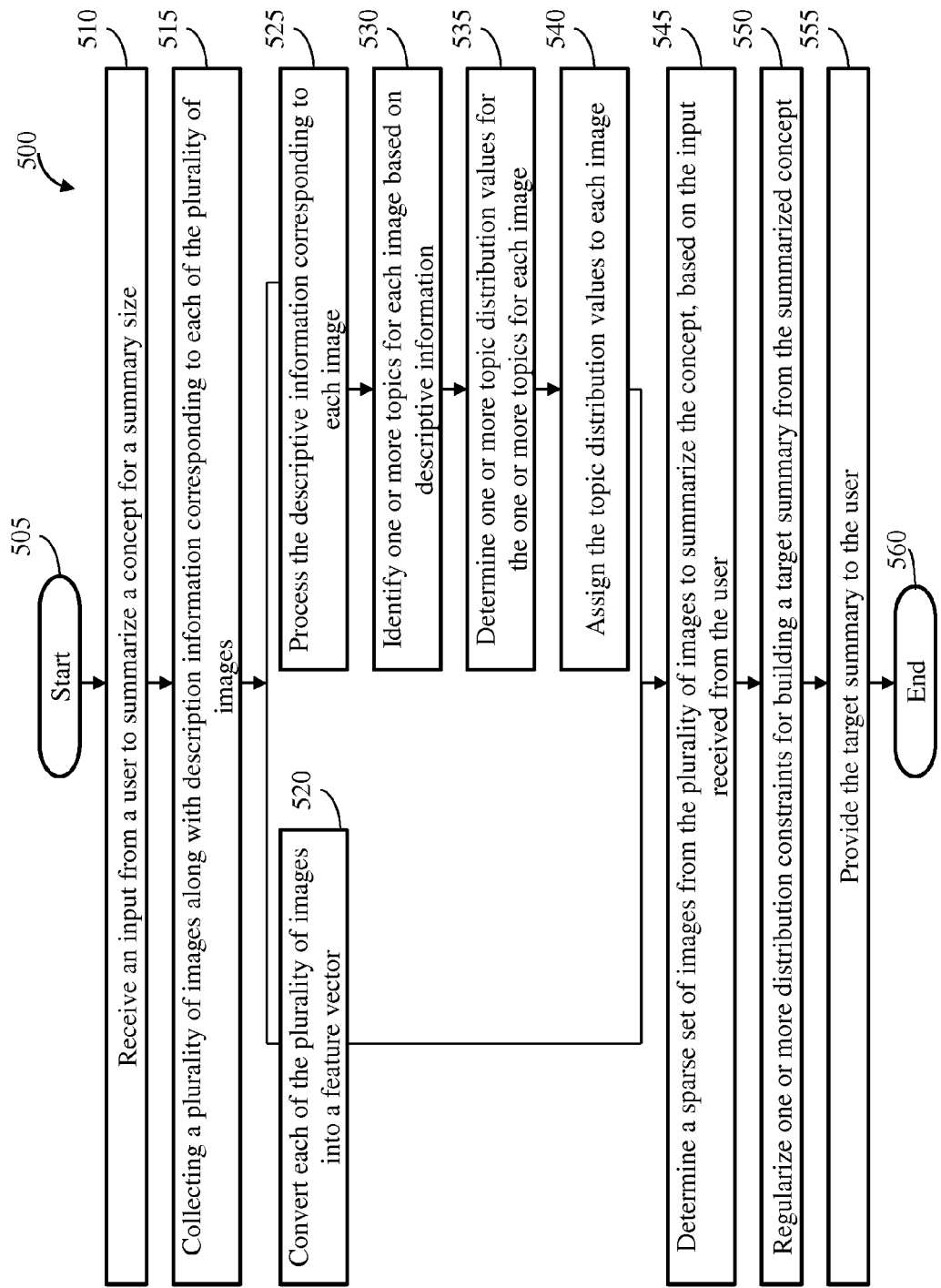
FIG. 5 is a flowchart illustrating method for summarizing a concept, in accordance with another embodiment of the disclosure.

FIG. 5 is a flowchart illustrating method 500 for summarizing a concept, in accordance with another embodiment of the disclosure. The method 500 can be implemented using steps similar to the method 400 of FIG. 4. Description of such method steps are not repeated here for the sake of brevity and may be understood when read in conjunction with FIG. 4. Further, the order and number of steps in which the method 400 is described is not intended to be construed as a limitation.

Method 500 starts at step 505. At step 510, an input may be received from a user to summarize a concept for a summary size such as the summary size 'L'. The summary size may be determined based on pre-defined rules. In an embodiment, the summary size may be preset by a user. The summary size denotes a number of images to be selected for a subset of images to summarize the concept. The input may include a query corresponding to a concept. The query may be provided to search a subset of relevant images to summarize the concept based on the user's requirements that may be determined through the query. Further, the input may include a source for extracting a plurality of images, therefrom, to generate the subset of relevant images.

At step 515, a plurality of images along with the corresponding descriptive information may be collected from the source. Further, at step 520, each of the plurality of images may be converted into a feature vector. Step 515 and step 520 are explained earlier in conjunction with FIG. 4 so the corresponding description is not repeated here for the sake of brevity.

At step 525, the descriptive information corresponding to each image (as collected at step 515) may be processed. Further, the descriptive information corresponding to each image may be processed by using one or more standard techniques such as removal of stop-words, words with very low and high frequency and the like.

At step 530, one or more topics for each image may be identified based on descriptive information. The one or more topics may be determined by performing, in one embodiment, LDA on the descriptive information. Further, at step 535, one or more topic distribution values may be determined corresponding to the one or more topics for each image. Each of the topic distribution values includes a probability value for assigning the corresponding topic to an image of the plurality of images. For example, if for an image, three topics (such as t1, t2 and t3) are identified through LDA, then the probability values for each topic for the image may be determined as p(t1), p(t2) and p(3). In an embodiment, the sum of all the probability values is '1'. The probability value of each topic may define the suitability of the topic for assigning to the image.

At step 540, the topic distribution values corresponding to each topic of the one or more topics may be assigned to the image.

At step 545, feature vector(s) and topic distribution value assigned with each image may be received from step 520 and step 540 respectively. Further, at step 545, a sparse set of images may be determined from the plurality of images to summarize the concept. In an embodiment, the sparse set of images may be determined based on the input received from the user. The number of images in the sparse set may be based upon a summary size. The sparse set may be determined by building a sparse kernel classifier. The sparse kernel classifier for creating the sparse set of images has previously explained in conjunction with FIG. 2, FIG. 3, and FIG. 4 and thus is not repeated here for the sake of brevity.

At step 550, one or more distribution constraints may be regularized for building a target summary from the summarized concept. The user may specify various specific constraints in the summarized concept to form a target summary as required by the user. Further, the one or more distribution constraints may be regularized by utilizing a regularization term to minimize divergence between the summarized concept and the target summary. In an embodiment, the concept summary (i.e. sparse set of summarized concept) may be treated as the target summary in the absence of the one or more distribution constraints.

At step 555, the target summary may be provided to the user. For example, the summarized concept (or target summary) may be displayed to the user. Further, the method 500 ends at 560.

The method 500 is not restricted to the information as explained herein. Some of the embodiments have not been repeated here in the description of FIG. 5 for the sake of brevity. The method 500 may be understood more clearly if read in conjunction with FIG. 2, FIG. 3 and FIG. 4. Various other embodiments to explain the invention without deviating from the scope of the present disclosure.

Figure 6:
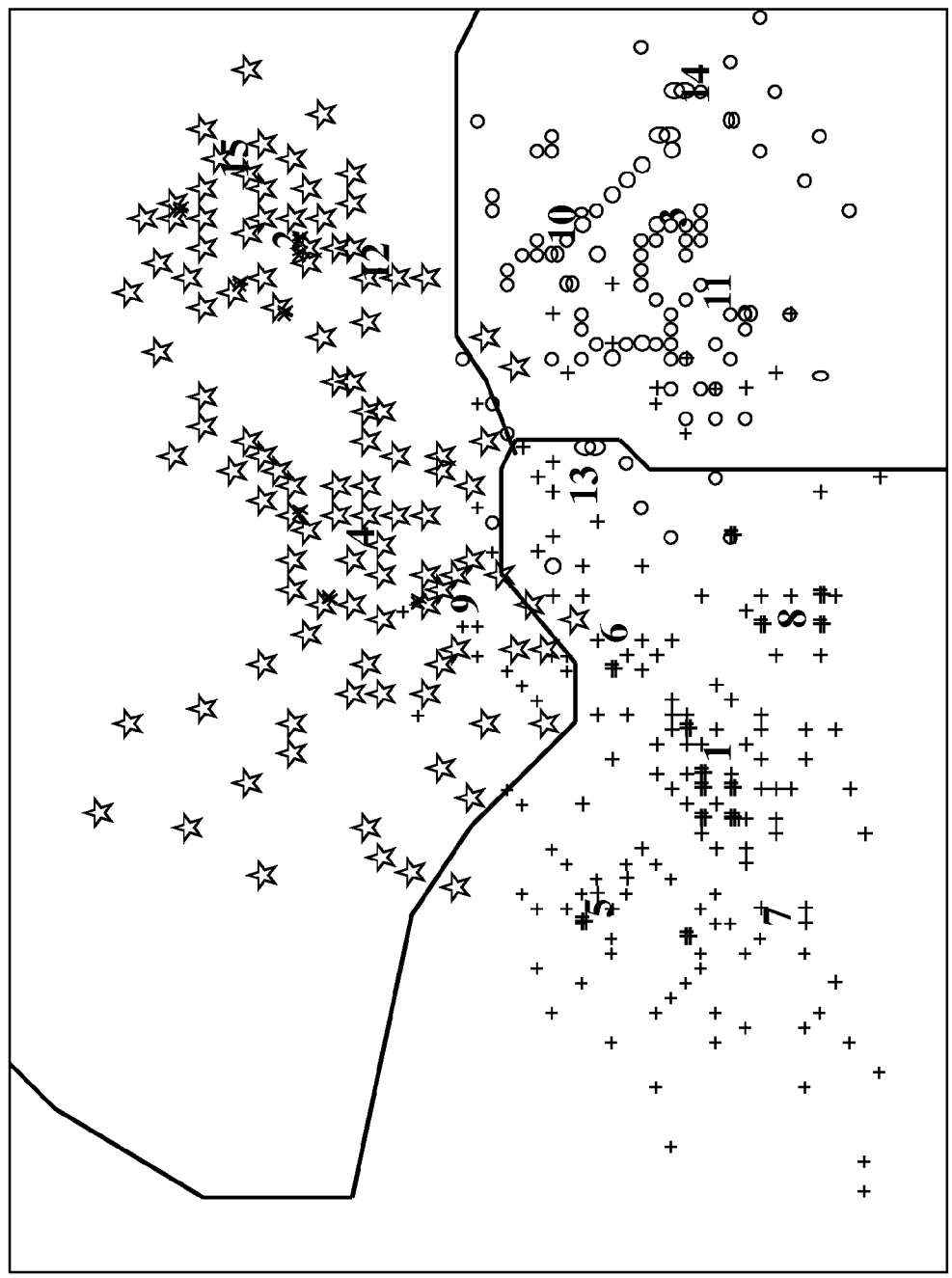
FIG. 6 is a diagram illustrating an Import Vector Machine (IVM) finding a subset to summarize a concept, in accordance with an embodiment of the disclosure.

FIG. 6 is an exemplary diagram illustrating an IVM finding a subset to summarize a concept, in accordance with an embodiment of the disclosure. FIG. 6 depicts a mixture of Gaussian data that presents some results on a toy 4-component Gaussian mixture data belonging to three categories, as depicted through different symbols (such as '+', '*' and 'o') and boundary lines. (Note that, for convenient typography, the symbol shown in FIG. 6 as a five-pointed star is here represented by an asterisk.) In FIG. 6, each of category 1 (represented by 'o') and category 2 (represented by '*') consists of a single Gaussian. Further, category 3 (represented by '+') consists of mixture of two Gaussians. FIG. 6 depicts the top fifteen ('15') import vectors numbered as per the selection order at their respective positions. It may be noted that the first four ('4') import vectors are placed nearly at the centers of the four ('4') clusters. Thereafter, the vectors may be selected from the centers and some of them are placed at the boundaries of the clusters. It may be appreciated by any person skilled in the art that as the cluster in category 1 is very big, more vectors may be selected from this category.

Further, in image context, the boundary points may represent the images that have attributes of both categories. On the other hand, points away from the centers and boundaries may help in choosing diverse images belonging to the same category. Thus, it may be appreciated by any person skilled in the art that apart from cluster at centers, both these types of images are also useful for the summary and such selection may meet the important properties in the summarized concept.

Various import vectors may be selected by IVM to create the subset 'S'. The import vectors may be selected by satisfying various common properties corresponding to visual aspect and semantic aspect of the subset of images (of summary). Further, in one embodiment, the systems and the method may make various assumptions such as: (1) the summary size |S| is sufficiently large to capture all important aspects, and (2) the hypothesis that common topics and images are important is true.

The properties corresponding to the visual and semantic aspects of images (present in the summary of the concept) may include, but are not restricted to, coverage, diversity and balance. In an exemplary embodiment, the properties corresponding to the visual aspects are explained as follows:

Coverage:

In a region of the feature space where images are nicely clustered (that is, many similar images are existing in the region). These images are therefore interesting and important. These images may be expected to belong to the same class (such as 'c') and they will have similar class probability distributions. Then, it may be understood from equation (2) that for a suitable choice of the coefficients, the function ^fc( ) (as explained, '^fm(x)', earlier in this disclosure) may have a higher score (for all the images in the region), if a chosen import vector (image) in the region is very similar to all the other images in the region. Such a choice of the import vectors may contribute significantly to the minimization of equation (5) due to simultaneous minimization of various terms the first part of the equation (5) (i.e.

$$\min_{S,a} -\frac{1}{N}\sum_{i=1}^{N}\sum_{j=1}^{M} q_{i,j}\log(^\wedge P(c_j|x_i))).$$

Therefore, one or more import vectors may be selected from a cluster containing many similar images. Further, this may hold for every important cluster of the images. This may further satisfy the property of Likelihood. In an embodiment, each class may have more than one cluster. The coverage property may be satisfied if the import vectors come from every important cluster. Further, the import vectors may come from all important clusters rather than from just one cluster. This is explained further in conjunction with next property, i.e. 'Diversity'.

Diversity:

In an embodiment, there may be more than one cluster of images. Then, a sequential greedy selection process that may select an import vector to make significant improvement in the objective function value in each step may select an import vector from each cluster (possibly, in an order commensurate with the sizes of the clusters). This may be because selecting more import vectors than needed from a cluster would not give significant improvement in the objective function value as compared to selecting an import vector from another cluster. Further, it may be appreciated by any person skilled in the art that the diversity in selecting the images may be achieved by selecting vectors from other regions like near the boundaries (away from the centers), in addition to selecting the import vectors nearly from all the centers of the clusters.

Balance:

As explained in the mixture of Gaussian (in conjunction with FIG. 6), the number of import vectors that come from each cluster may depend on the relative size of each cluster with respect to the other clusters. The size of the cluster may be defined by the number of points in the cluster and its spread. Therefore, balancing takes place automatically through our objective function (provided in equation (5) in conjunction with FIG. 3).

Further, in an exemplary embodiment, the properties corresponding to the semantic aspects are explained as follows:

Coverage:

'Coverage' requires all important semantic aspects to be present in the summary. Therefore, if the hypothesis that there will be many images for each important semantic aspect (class) holds, coverage is ensured. This is because as explained above the import vectors may be selected from important clusters of each class.

Diversity:

As explained, the import vectors come from all of the classes. This is because to model the underlying class probability distributions for all of the images well, the import vectors may be expected to come from all of the classes. As the classes may represent the different semantic aspects of a concept, diversity may be maintained.

Balance:

The number of import vectors selected from each class depends on the size of the different clusters in the class. Thus, the summary may emphasize the various aspects in a balanced way.

The present disclosure as described above has numerous advantages. Based on the aforementioned explanation, it can be concluded that the various embodiments of the present disclosure may be utilized for summarizing a concept. The present disclosure covers all important semantic aspects in a balanced way to cover all relevant images in the summarized concept. Further, the present disclosure enables the user to specify additional distribution constraints and properties like preferred topic and temporal distributions in the summary. This enables the user to categorize the summarized information in a desired way.

Further, the present disclosure generates summary by considering all important properties such as likelihood, balance, diversity and coverage. This covers all the relevant images from a given source. Furthermore, the present disclosure utilizes multiple functions to address multi-class problems.

The present disclosure stores various processed objects such as the images and corresponding descriptive information that may be reused for further processing and thus may increase efficiency of systems of the present disclosure. Further, the systems of the present disclosure utilize LDA that enables an automatic topic distribution to a plurality of images. Thus, there is no need for manual annotation of images with the category information. This reduces the user's effort and time in topic distribution and makes the process of concept summarization fast.

The present invention may also be embodied in a computer program product for summarizing a concept. The computer program product may include a non-transitory computer usable medium having a set program instructions comprising a program code for determining a sparse set of images to summarize the concept. The set of instructions may include various commands that instruct the processing machine to perform specific tasks such as tasks corresponding to building a target summary from the sparse set of images for summarizing the concept. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A computer-implemented method for summarizing a concept, the method comprising:
   receiving, from a user, a query corresponding to the concept;
   identifying a source based on the query;
   collecting, from the source, a plurality of images along with descriptive information corresponding thereto;
   forming feature vectors with processed descriptive information by processing the plurality of images and the descriptive information;

assigning each of the plurality of images with one or more topic distribution values corresponding to one or more topics, the one or more topics corresponding to the feature vectors with the processed descriptive information;

receiving, from the user, a summary size that represents a number of images to be a size of a sparse set of images;

determining the sparse set of images from the plurality of images to summarize the concept, wherein a size of the sparse set of images is the summary size and the sparse set of images being determined based on the feature vectors and the assigned topic distribution values, wherein the sparse set of images is limited to the summary size; and regularizing one or more distribution constraints for building a target summary from the summarized concept, the one or more distribution constraints being regularized by utilizing a regularization term to minimize divergence between the summarized concept and the target summary, wherein the regularization term is received from the user;

providing the sparse set of images to the user responsive to the query from the user.

2. The method of claim 1 further comprising:
identifying an adapter from a plurality of adapters depending on the identified source, wherein the plurality of adapters each correspond to a different source.

3. The method of claim 1 further comprising identifying the one or more topics for the plurality of images based on the processed descriptive information.

4. The method of claim 1 further comprising determining the one or more topic distribution values of the one or more topics corresponding to each image, each of the topic distribution values comprising probability value for assigning the corresponding topic to an image of the plurality of images.

5. The method of claim 1, wherein the sparse set of images is determined by defining a sparse kernel classifier.

6. A computer program product stored on a non-transitory computer-readable medium that when executed by a processor, performs a method for summarizing a concept, the method comprising:
receiving, from a user, a query corresponding to the concept;
collecting a plurality of images along with descriptive information corresponding thereto, the plurality of images being collected from a source corresponding to the query;
processing the plurality of images and the descriptive information to form feature vectors and processed descriptive information respectively, each of the plurality of images corresponding to one of the feature vectors;
assigning each of the plurality of images with one or more topic distribution values corresponding to one or more topics, the one or more topics corresponding to the processed descriptive information;
receiving, from the user, an input that includes a summary size that represents a number of images for the summarizing;
determining a sparse set of images from the plurality of images to summarize the concept, the sparse set of images being determined based on the feature vectors and the assigned topic distribution values, wherein a size of the sparse set of images is limited to the summary size;

regularizing one or more distribution constraints for building a target summary from the summarized concept by receiving constraints from the user that are used by the summarizing module when determining the sparse set of images, wherein the input received from the user includes the constraints; and providing the sparse set of images responsive to the query.

7. The computer program product of claim 6, wherein the plurality of images and the corresponding descriptive information are collected from the source corresponding to the concept.

8. The computer program product of claim 6, further comprising determining the one or more topic distribution values of the one or more topics corresponding to each image, each of the topic distribution values comprising probability value for assigning a corresponding topic to an image of the plurality of images.

9. The computer program product of claim 6, wherein the sparse set of images is determined based on a summarization size.

10. The computer program product of claim 6, further comprising providing the target summary to the user.

11. A system for summarizing a concept, the system comprising a processor and a memory for:
receiving a query from a user, wherein the query is corresponding to the concept;
collecting a plurality of images and descriptive information corresponding to each of the plurality of images from a source, the source being identified based on the query, wherein the plurality of images correspond to the query;
converting the plurality of images into corresponding feature vectors, processing the descriptive information corresponding to each image of the plurality of images;
identifying one or more topics for the plurality of images based on the processed descriptive information;
assigning one or more topic distribution values corresponding to the one or more topics to each image of the plurality of images;
determining a sparse set of images from the plurality of images to summarize the concept, the sparse set of images being determined based on the corresponding feature vectors and the assigned topic distribution values, wherein the summary of the concept produced by the summarizing module is related to a summary size representing a number of images in the sparse set of images, and further wherein the summary size is input received from the user;
regularizing one or more distribution constraints for the summarizing module to build a target summary from the summarized concept, the one or more distribution constraints being regularized by utilizing a regularization term to minimize divergence between the summarized concept and the target summary, wherein the regularization term is received as part of the input from the user; and
providing the sparse set of images responsive to the query.

12. The system of claim 11, wherein the receiving further receives the source for collecting the plurality of images.

13. The system of claim 11, further comprising extracting the descriptive information for each of the plurality of images depending on the source identified based on the query.

14. The system of claim 11, further comprising storing, with a database, the processed descriptive information.

15. The system of claim 11, further comprising identifying the one or more topics by performing a latent semantic analysis of the processed descriptive information.

16. The system of claim 11, further comprising determining the one or more topic distribution values of the one or more topics corresponding to each image, each of the topic distribution values comprising probability value for assigning a corresponding topic to an image of the plurality of images.

17. The system of claim 11, wherein the sparse set of images is determined based on the summarization size.

* * * * *